(12) United States Patent
Todate et al.

(10) Patent No.: US 12,110,190 B2
(45) Date of Patent: Oct. 8, 2024

(54) METHOD FOR ARRANGING AND DELIVERING CONVEYED OBJECTS

(71) Applicant: RHEON AUTOMATIC MACHINERY CO., LTD., Tochigi (JP)

(72) Inventors: Akira Todate, Tochigi (JP); Shingo Naoi, Tochigi (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 190 days.

(21) Appl. No.: 17/918,715

(22) PCT Filed: Apr. 16, 2021

(86) PCT No.: PCT/JP2021/015729
§ 371 (c)(1),
(2) Date: Oct. 13, 2022

(87) PCT Pub. No.: WO2021/210680
PCT Pub. Date: Oct. 21, 2021

(65) Prior Publication Data
US 2023/0242352 A1 Aug. 3, 2023

(30) Foreign Application Priority Data
Apr. 17, 2020 (JP) ................ 2020-074216

(51) Int. Cl.
*B65G 43/10* (2006.01)
*B65G 43/08* (2006.01)
(Continued)

(52) U.S. Cl.
CPC ............ *B65G 47/31* (2013.01); *B65G 43/08* (2013.01); *B65G 43/10* (2013.01); *B65G 47/38* (2013.01); *B65G 2201/0202* (2013.01)

(58) Field of Classification Search
CPC .............. B65G 47/34; B65G 2201/0202; B65G 43/10; B65G 43/08; B65G 47/38; B65G 47/31
(Continued)

(56) References Cited

U.S. PATENT DOCUMENTS 5,779,023 A 6/1998 Hidai et al.
2018/0139971 A1 5/2018 Ueno

FOREIGN PATENT DOCUMENTS

EP 2556006 * 2/2013
JP 09278166 A 10/1997
JP 2018082649 A 5/2018

OTHER PUBLICATIONS

Written Opinion of International Search Report and translation of International Search Report, JPRO, Jan. 6, 2021.

* cited by examiner

*Primary Examiner* — Gene O Crawford
*Assistant Examiner* — Lester Rushin, III
(74) *Attorney, Agent, or Firm* — Dilworth & Barrese, LLP

(57) ABSTRACT

An arranging conveyor system has outlet conveyors in a plurality of lines, intermediate conveyors in the plurality of lines, and transferring/discharging conveyors in the plurality of lines. When a discharging interval has not passed from a previous discharging action and a predetermined clog condition in a specific line is fulfilled, a conveyed object which is present in the specific line at a stop position on the transferring/discharging conveyor is discharged outside of the arranging conveyor system.

9 Claims, 10 Drawing Sheets

(51) Int. Cl.
    *B65G 47/31* (2006.01)
    *B65G 47/38* (2006.01)
(58) Field of Classification Search
    USPC .................................................... 198/460.1
    See application file for complete search history.

METHOD FOR ARRANGING AND DELIVERING CONVEYED OBJECTS

TECHNICAL FIELD

The present invention relates to a method for laterally arranging and delivering a plurality of conveyed objects by an arranging conveyor system, in which the conveyed objects are supplied in a plurality of lines in a traveling direction without being aligned with each other in a lateral direction with respect to the traveling direction.

BACKGROUND ART

Conventionally, a method for laterally arranging and delivering a plurality of dough pieces by an arranging conveyor system is known, in which the dough pieces are supplied in a plurality of lines in a traveling direction without being aligned with each other in a lateral direction with respect to the traveling direction (for example, see Patent Publications 1 and 2 below). Concretely, in each of the plurality of lines, an arranging conveyor is provided, and when a dough piece reaches a stop position on the arranging conveyor, the arranging conveyor is stopped. In all of the plurality of lines, when the dough pieces reach the stop positions on the arranging conveyors, the dough pieces of the plurality of lines are aligned with each other in the lateral direction. Then, by driving the arranging conveyors in all of the plurality of lines, the dough pieces in the plurality of lines are delivered from the arranging conveyor with being aligned with each other in the lateral direction.

PRIOR ART PUBLICATION

Patent Publication 1: Japanese Patent Laid-open Publication No. H09-278166
Patent Publication 2: Japanese Patent Laid-open Publication No. 2018-082649

SUMMARY OF THE INVENTION

Problem to be Solved by the Invention

An amount of the dough pieces supplied per unit time (receiving amount) is not always constant or may vary. As the receiving amount increases, an amount of the dough pieces delivered per unit time (delivering amount) from the arranging conveyor with being aligned with each other also increases. This means that a time interval of delivering the dough pieces decreases, namely, a pitch of the delivered dough pieces decreases. In this case, when the delivering amount exceeds a capacity of devices downstream of the arranging conveyor (such as a panner and an oven), clog of dough pieces may be caused downstream of the arranging conveyor (referred to as "downstream clog" hereinafter).

Further, while a dough piece in a specific line of the plurality of lines is stopped at the stop position of the arranging conveyor, a following dough piece in the specific line may be supplied (referred to as "upstream clog" hereinafter). In this case, before a dough piece in at least one of the plurality of lines reaches the stop position on the arranging conveyor, the dough pieces may be delivered from the arranging conveyor. As a result, the number of the dough pieces, which are delivered with being aligned with each other in the lateral direction, decreases, and an empty space is made. Thus, operations of devices downstream of the arranging conveyor (for example, panner, and oven) may become inefficient. When the dough pieces are baked in an oven, unevenness baking may be caused.

Accordingly an object of the present invention is that in a method for delivering a plurality of conveyed objects with aligning the conveyed objects with each other in a lateral direction with respect to a traveling direction by an arranging conveyor system, the conveyed objects being supplied in a plurality of lines in the traveling direction without being aligned with each other in the lateral direction, the downstream clog is prevented from being caused, and a frequency of a state in which a smaller number of the dough pieces aligned with each other in the lateral direction are delivered can be decreased.

Means for Solving the Problem

To achieve the above-stated purpose, a method of the present invention for delivering a plurality of conveyed objects with aligning the conveyed objects with each other in a lateral direction with respect to a traveling direction by an arranging conveyor system, the conveyed objects being supplied in a plurality of lines in the traveling direction without being aligned with each other in the lateral direction, the arranging conveyor system having, for each of the plurality of lines, an outlet conveyor, at least one intermediate conveyor disposed adjacent to and upstream of the outlet conveyor, and a transferring/discharging conveyor disposed adjacent to and upstream of the intermediate conveyor, includes stopping the conveyed object at a stop position on the outlet conveyer in each of the plurality of lines to align the conveyed objects with each other in the lateral direction; setting a delivering interval to a predetermined value for delivering the conveyed objects from the outlet conveyor with aligning the conveyed objects with each other in the lateral direction; determining whether the delivering interval has passed from a previous delivering action; delivering the conveyed objects in all of the plurality of lines downstream from the outlet conveyers when the delivering interval has passed from the previous delivering action and the conveyed objects in all of the plurality of lines are present at the stop positions on the outlet conveyers; and discharging the conveyed object outside of the arranging conveyor system, which conveyed object is present in a specific line of the plurality of lines at a stop position on the transferring/discharging conveyor, when the delivering interval has not passed from the previous delivering action and a predetermined clog condition in the specific line is fulfilled.

In this method, the delivering interval for delivering the plurality of conveyed objects from the outlet conveyors with aligning the conveyed objects with each other in the lateral direction is set to a predetermined value. By setting the delivering interval to the predetermined value at which no downstream clog is caused, the downstream clog can be prevented from being caused. Further, when the delivering interval has not passed from the previous delivering action and the predetermined clog condition is fulfilled in the specific line of the plurality of lines, namely, when the upstream clog is caused, the conveyed object, which is present at the stop position on the transferring/discharging conveyor in the specific line, is discharged outside of the arranging conveyor system. This means that the conveyed objects, which are aligned with each other on the outlet conveyers, are not delivered from the outlet conveyers, or are waiting. As a result, a frequency of a state in which a smaller number of the conveyed objects aligned with each other in the lateral direction are delivered can be decreased.

In the method, preferably, the predetermined clog condition is when the next conveyed object in the specific line comes close to the transferring/discharging conveyor while the conveyed objects in the specific line are present at the stop positions on all of the outlet conveyor, the at least one intermediate conveyor, and the transferring/discharging conveyor; or when the next conveyed object in the specific line has reached the stop position on the transferring/discharging conveyor while the conveyed objects in the specific line are present at the stop positions on all of the outlet conveyor and the at least one intermediate conveyor.

The method, preferably, further includes determining the number of the conveyed objects in the plurality of lines, which conveyed objects are present at stop positions on the intermediate conveyors, when the conveyed objects in all of the plurality of lines are delivered downstream from the outlet conveyor; updating the predetermined value to increase the delivering interval when the number is smaller than a predetermined range or is smaller than or equal to a first predetermined number; and updating the predetermined value to decrease the delivering interval when the number is larger than the predetermined range or is larger than or equal to a second predetermined number.

In the above-described method, in a case that the conveyed objects in the plurality of lines have been delivered from the outlet conveyors, when the number of the conveyed objects which are present at the stop positions on the intermediate conveyors is smaller than the predetermined range or smaller than or equal to the first predetermined number, since an amount of receiving the conveyed objects is smaller than an amount of delivering the conveyed objects, the predetermined value of the delivering interval is updated to increase the delivering interval. Further, in the case that the conveyed objects in the plurality of lines have been delivered from the outlet conveyors, when the number of the conveyed objects which are present at the stop positions on the intermediate conveyors is larger than the predetermined range or larger than or equal to the second predetermined number, since the amount of receiving the conveyed objects is larger than the amount of delivering the conveyed objects, the predetermined value of the delivering interval is updated to decrease the delivering interval. Thus, the delivering interval is adjusted to make the amount of receiving the conveyed objects close to the amount of delivering the conveyed objects so that the upstream clog is prevented from being caused. As a result, the frequency of the state in which a smaller number of the dough pieces aligned with each other in the lateral direction are delivered can be decreased.

The method may further includes, when the delivering interval has passed from the previous delivering action, the conveyed object in at least one of the plurality of lines is not present at the stop position on the outlet conveyor, and the predetermined clog condition in a specific line of the plurality of lines is fulfilled, delivering the conveyed objects in the plurality of lines downstream from the outlet conveyor, which conveyed objects are present at the stop positions on the outlet conveyors, or discharging the conveyed object in a specific line outside of the arranging conveyor system, which conveyed object is present at the stop position on the transferring/discharging conveyor.

When the conveyed objects which are present in the plurality of lines at the stop positions on the outlet conveyors are delivered downstream from the outlet conveyer, a smaller number of the conveyed objects aligned with each other in the lateral direction are delivered, but the amount of delivering the conveyed objects is increased, so that the upstream clog can be relaxed. Further, when the conveyed object which is present in the specific line at the stop position on the transferring/discharging conveyor is discharged outside of the arranging conveyor system, the conveyed objects aligned with each other on the outlet conveyors are not delivered from the outlet conveyors and are still waiting. Thus, the frequency of a state in which a smaller number of the conveyed objects aligned with each other in the lateral direction are delivered can be decreased.

In order to achieve the above object, another method according to the present invention for delivering a plurality of conveyed objects with aligning the conveyed objects in a lateral direction with respect to a traveling direction by an arranging conveyor system, the conveyed objects being supplied in a plurality of lines in the traveling direction without being aligned in the lateral direction, the arranging conveyor system having, for each of the plurality of lines, an outlet conveyor, at least one intermediate conveyor disposed adjacent to and upstream of the outlet conveyor, and a transferring/discharging conveyor disposed adjacent to and upstream of the intermediate conveyor, comprising stopping the conveyed object at a stop position on the outlet conveyer in each of the plurality of lines to align the conveyed objects in the lateral direction; setting a delivering interval to a predetermined value for delivering the conveyed objects from the outlet conveyor with aligning the conveyed objects with each other in the lateral direction; determining whether the delivering interval has passed from a previous delivering action; determining the number of the conveyed objects in the plurality of lines, which conveyed objects are present at stop positions on the intermediate conveyors, after the delivering interval has passed from a previous delivering action and when the conveyed object in at least one of the plurality of lines is delivered downstream from the outlet conveyor; updating the predetermined value to increase the delivering interval when the number is smaller than a predetermined range or is smaller than or equal to a first predetermined number; and updating the predetermined value to decrease the delivering interval when the number is larger than the predetermined range or is larger than or equal to a second predetermined number.

In this method, the delivering interval for delivering the plurality of conveyed objects from the outlet conveyors with aligning in the lateral direction is set to a predetermined value. By setting the delivering interval to the predetermined value at which no downstream clog is caused, the downstream clog can be prevented from being caused. Further, in the case that the conveyed object in at least one of the plurality of lines has been delivered from the outlet conveyor, when the number of the conveyed objects which are present at the stop positions on the intermediate conveyors is smaller than the predetermined range or smaller than or equal to the first predetermined number, since an amount of receiving the conveyed objects is smaller than an amount of delivering the conveyed objects, the predetermined value of the delivering interval is updated to increase the delivering interval. Further, in the case that the conveyed object in at least one of the plurality of lines has been delivered from the outlet conveyor, when the number of the conveyed objects which are present at the stop positions on the intermediate conveyors is larger than the predetermined range or larger than or equal to the second predetermined number, since the amount of receiving the conveyed objects is larger than the amount of delivering the conveyed objects, the predetermined value of the delivering interval is updated to decrease the delivering interval. Thus, the delivering interval is adjusted to make the amount of receiving the conveyed objects close to the amount of delivering the conveyed objects so that the upstream clog is prevented from being caused. As a result, a frequency of the state in which a smaller number of the dough pieces aligned with each other in the lateral direction are delivered can be decreased.

In the above-described methods, the conveyed object is preferably a dough piece.

DESCRIPTION OF EMBODIMENTS

Figure 1:
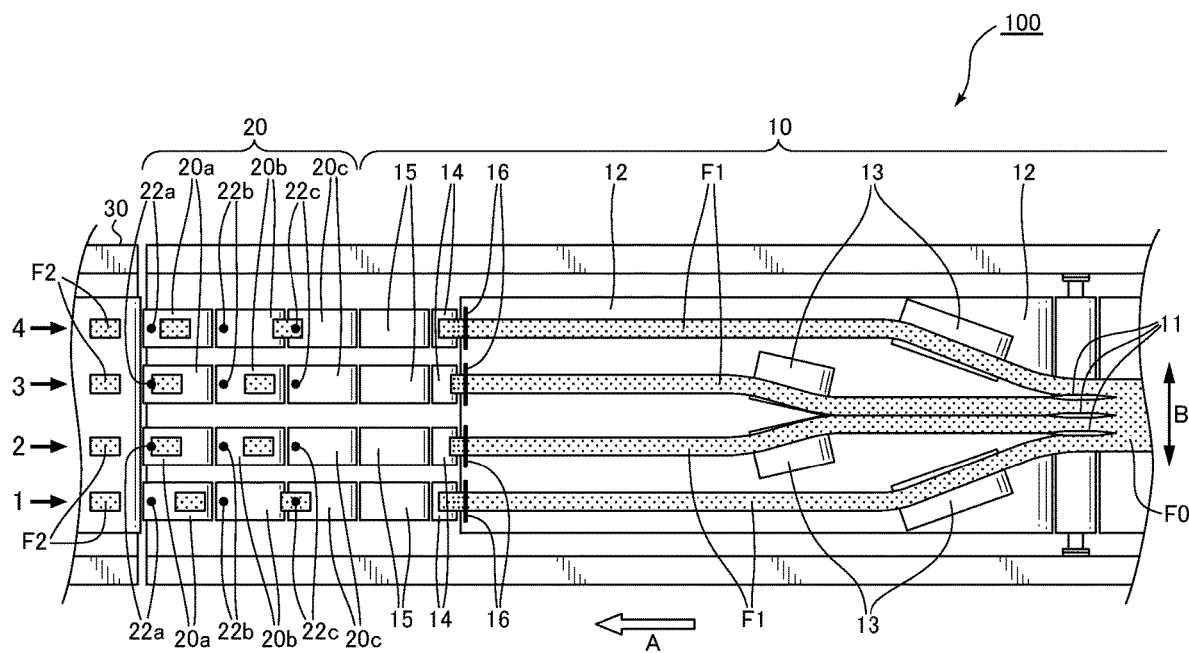
FIG. 1 is a plan view of a dough piece supplying system.

An embodiment shown in FIG. 1 is a dough piece supplying system 100, which includes a supplying section 10 for supplying four lines of dough pieces F2 in a traveling direction A, an arranging conveyor system 20 for aligning the dough pieces F2 in the four lines in a lateral direction B with respect to the traveling direction A, and a delivering conveyor 30.

The supplying section 10 includes a dough discharging device (not shown) for discharging and transferring a band-like dough F0 formed to have a predetermined width and a predetermined thickness, three circular cutters 11 for dividing the discharged dough F0 into four lines in the width (lateral) direction, a transferring conveyor 12 for transferring the divided doughs F1, four separating conveyors 13 disposed above the transferring conveyor 12 to separate the divided doughs F1 in the lateral direction B, and weighing conveyors 14, 15 and guillotine cutters 16 for cutting the dough F1 in each of the lines into dough pieces F2 with a desired weight. The dough pieces F2 cut by the guillotine cutters 16 are transferred without aligning with each other in the lateral direction B. The dough F0 is, for example, bread dough. The lines are referred to as "line 1", "line 2", "line 3", and "line 4" sequentially from the left side in the traveling direction.

The arranging conveyor system 20 includes, in each of the lines, an outlet conveyor 20a, an intermediate conveyor 20b disposed adjacent to and upstream of the outlet conveyor 20a, and a transferring/discharging conveyor 20c disposed adjacent to and upstream of the intermediate conveyor 20b. The transferring/discharging conveyor 20c is disposed adjacent to and downstream of the weighing conveyor 15. The conveyors 20a, 20b, 20c have sensors 22a, 22b, 22c for detecting the dough pieces F2, respectively. Positions of the sensors 22a, 22b, 22c in the traveling direction A are any positions at which the dough pieces F2 on the conveyors 20a, 20b, 20c can be detected. The conveyors 20a, 20b, 20c can be independently driven or stopped by a controller (not shown). Speeds of the conveyors 20a, 20b, 20c are preferably the same as each other. The transferring/discharging conveyor 20c can be switched between operations of transferring and discharging the dough piece F2. For example, a downstream end of the transferring/discharging conveyor 20c can be downwardly swung at the discharging operation. Namely, the transferring/discharging conveyor 20c can transfer the dough piece F2 to the intermediate conveyor 20b during the transferring operation, and discharge the dough piece F2 outside of the arranging conveyor system 20 at the discharging operation by swinging the downstream end.

Figure 2:
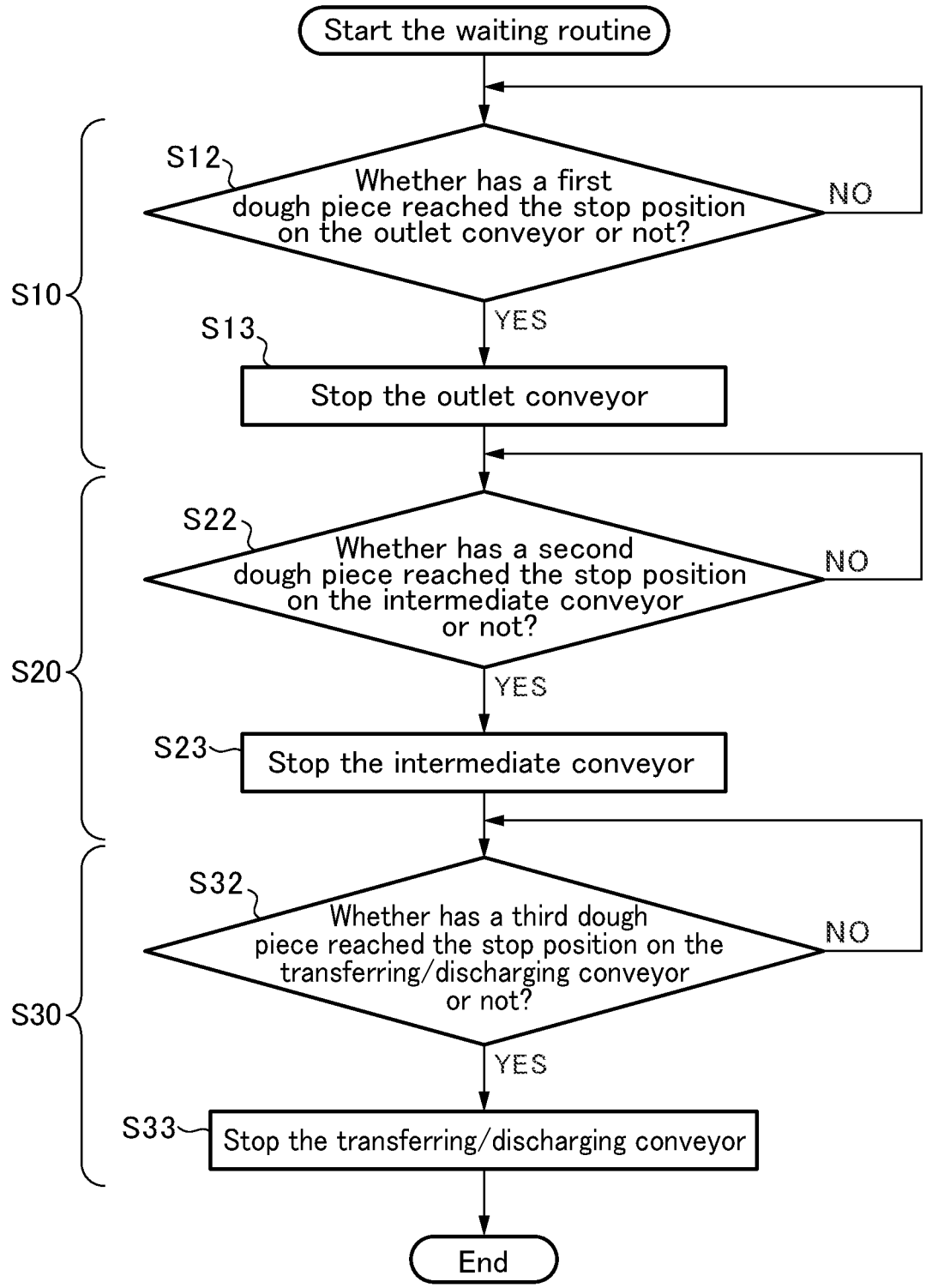
FIG. 2 is a flowchart of a waiting routine.

Next, referring to FIG. 2, an example of a flowchart of a waiting routine will be explained, by which the dough pieces F2 in each of the lines are made wait at stop positions on the outlet conveyor 20a, the intermediate conveyor 20b, and the transferring/discharging conveyor 20c of the arranging conveyor system 20. The waiting routine of the line 1 will be representatively explained, but the waiting routine can be equally applicable to the lines 2, 3, 4. At a start of the waiting routine, the conveyors 20a, 20b, 20c are being driven.

Figure 3:
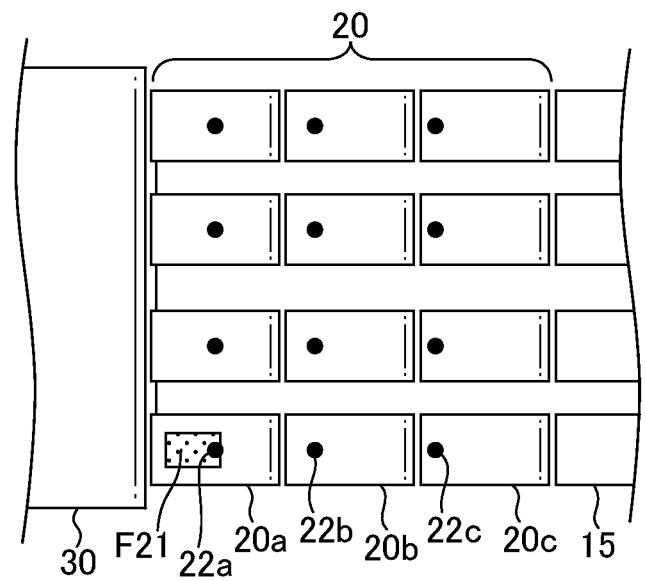
FIG. 3 is a view showing locations of dough pieces.

Firstly, in S10, a first dough piece F21 is stopped at the stop position on the outlet conveyor 20a. Concretely, in S12, whether the first dough piece F21 has reached the stop position on the outlet conveyor 20a (YES) or not (NO) is determined. This is determined, for example, by determining whether the dough piece F21 has reached the sensor 22a of the outlet conveyor 20a or not. In the case of YES, the flow goes to S13 to stop the outlet conveyor 20a (see FIG. 3). In the case of NO, the flow returns to S12.

Figure 4:
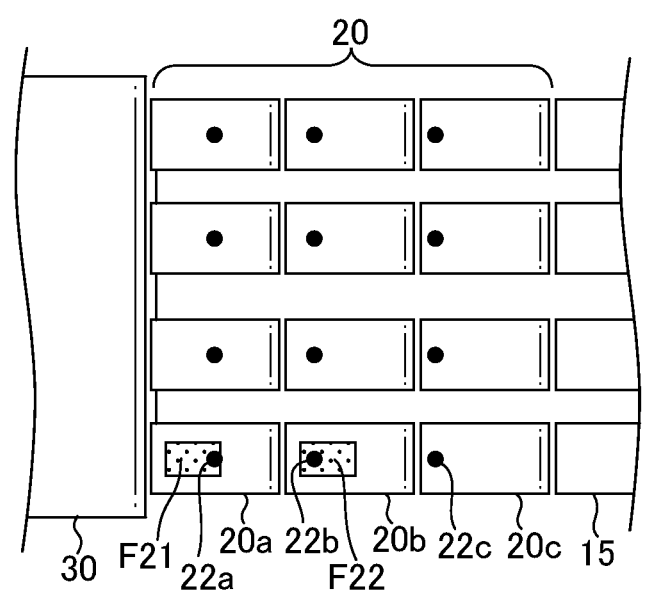
FIG. 4 is a view showing locations of dough pieces.

Next, in S20, a second dough piece F22 is stopped at the stop position on the intermediate conveyor 20b. Concretely, in S22, while the outlet conveyor 20a is stopped, whether the second dough piece F22 has reached the stop position on the intermediate conveyor 20b (YES) or not (NO) is determined. This is determined, for example, by determining whether the second dough piece F22 has reached the sensor 22b of the intermediate conveyor 20b or not. In the case of YES, the flow goes to S23 to stop the intermediate conveyor 20b (see FIG. 4). In the case of NO, the flow returns to S22.

Figure 5:
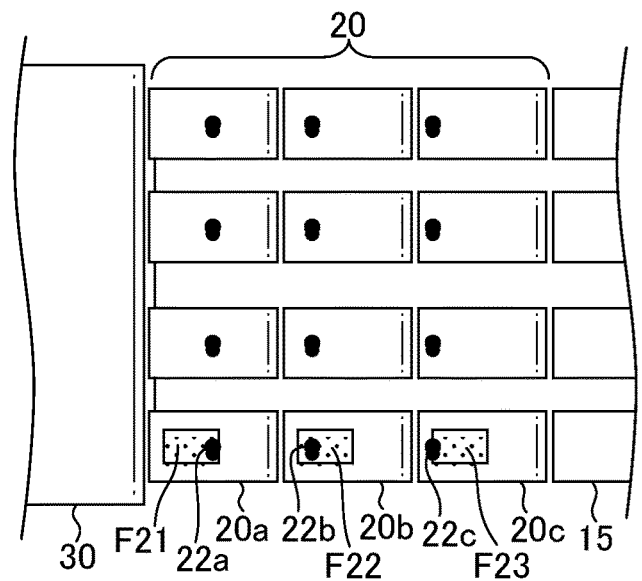
FIG. 5 is a view showing locations of dough pieces.

Next, in S30, a third dough piece F23 is stopped at the stop position on the transferring/discharging conveyor 20c. Concretely, in S32, while the intermediate conveyor 20b is stopped, whether the third dough piece F23 has reached the stop position on the transferring/discharging conveyor 20c (YES) or not (NO) is determined. This is determined, for example, by determining whether the third dough piece F23 has reached the sensor 22c of the transferring/discharging conveyor 20c or not. In the case of YES, the flow goes to S33 to stop the transferring/discharging conveyor 20c (see FIG. 5). In the case of NO, the flow returns to S32.

At the stop positions of the dough pieces F21, F22, F23, the sensors 22a, 22b, 22c may or may not detect the dough pieces F21, F22, F23, respectively. A distance between the sensor 22a and the sensor 22b is preferably shorter than a distance between the sensor 22b and the sensor 22c.

Next, referring to FIGS. 6-9, an example of a flowchart of a delivering routine will be explained, by which the first dough piece F21 is delivered from the outlet conveyor 20a to the delivering conveyor 30. The waiting routine and the delivering routine can be simultaneously performed, and, for example, even during the waiting routine, the first dough piece F21 can be appropriately delivered according to the delivering routine (i.e., the end of the delivering routine). If this is the case, the flow would restart from the start of the waiting routine. Before the start of the delivering routine, a predetermined value of a delivering interval is preset. The delivering interval is defined so that no downstream clog is caused. As explained later, when the delivering interval is updated (FIG. 11), an updated value of the delivering interval may be used. The predetermined value of the delivering interval may be, for example, 1 second (a value of a time interval), 60 rpm (a value of a number of cycles converted from the time interval), or 120 mm (a value of a distance or pitch). The predetermined value of the delivering interval may be defined between an upper limit value and a lower limit value.

Figure 6:
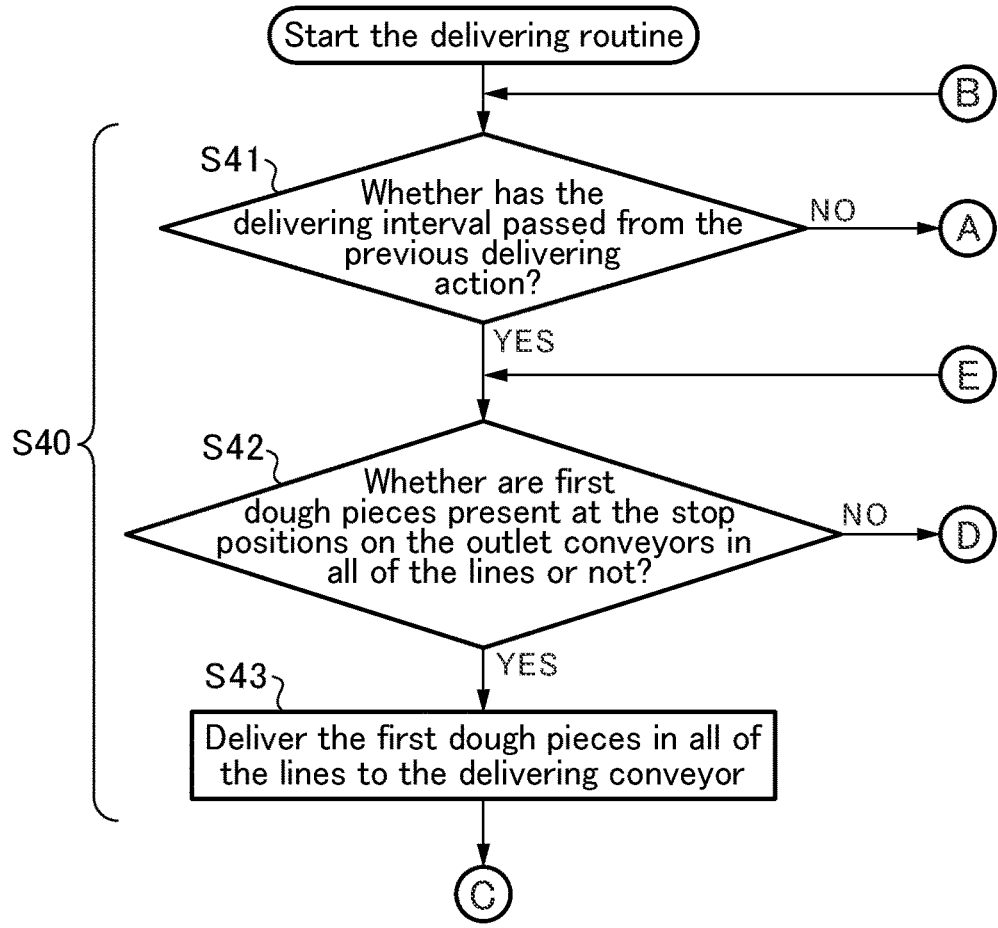
FIG. 6 is a flowchart of a delivering routine.
Figure 7:
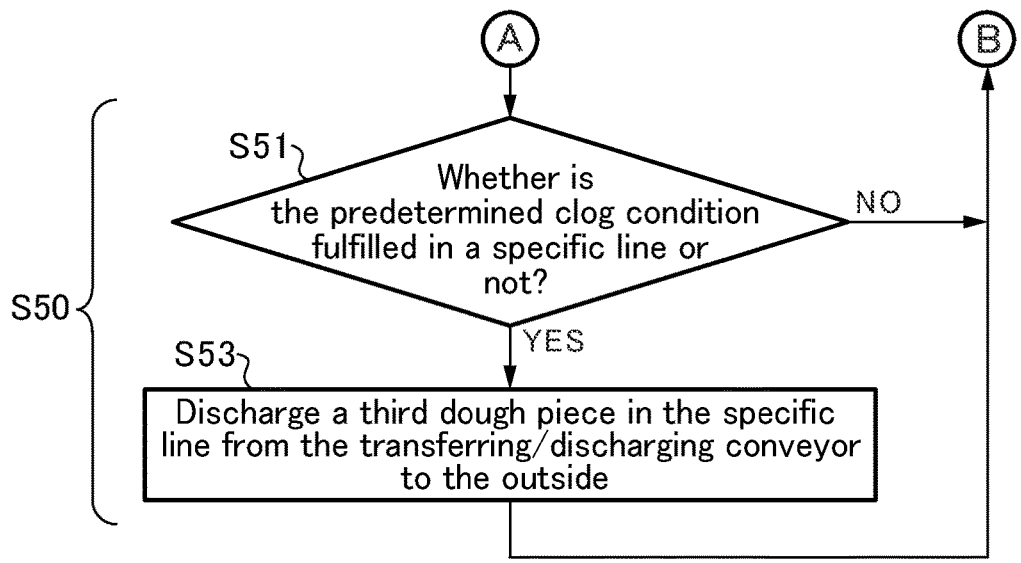
FIG. 7 is a flowchart of a delivering routine.

FIG. 6 shows a flow S40 for delivering the dough pieces F21 aligned with each other in the lateral direction B after the delivering interval has passed from the previous delivering action. Specifically, in S41, whether the delivering interval has passed from the previous delivering action (YES) or not (NO) is determined. In the case of YES, the flow goes to S42. In the case of NO, the flow goes to S51 (FIG. 7).

Figure 9:
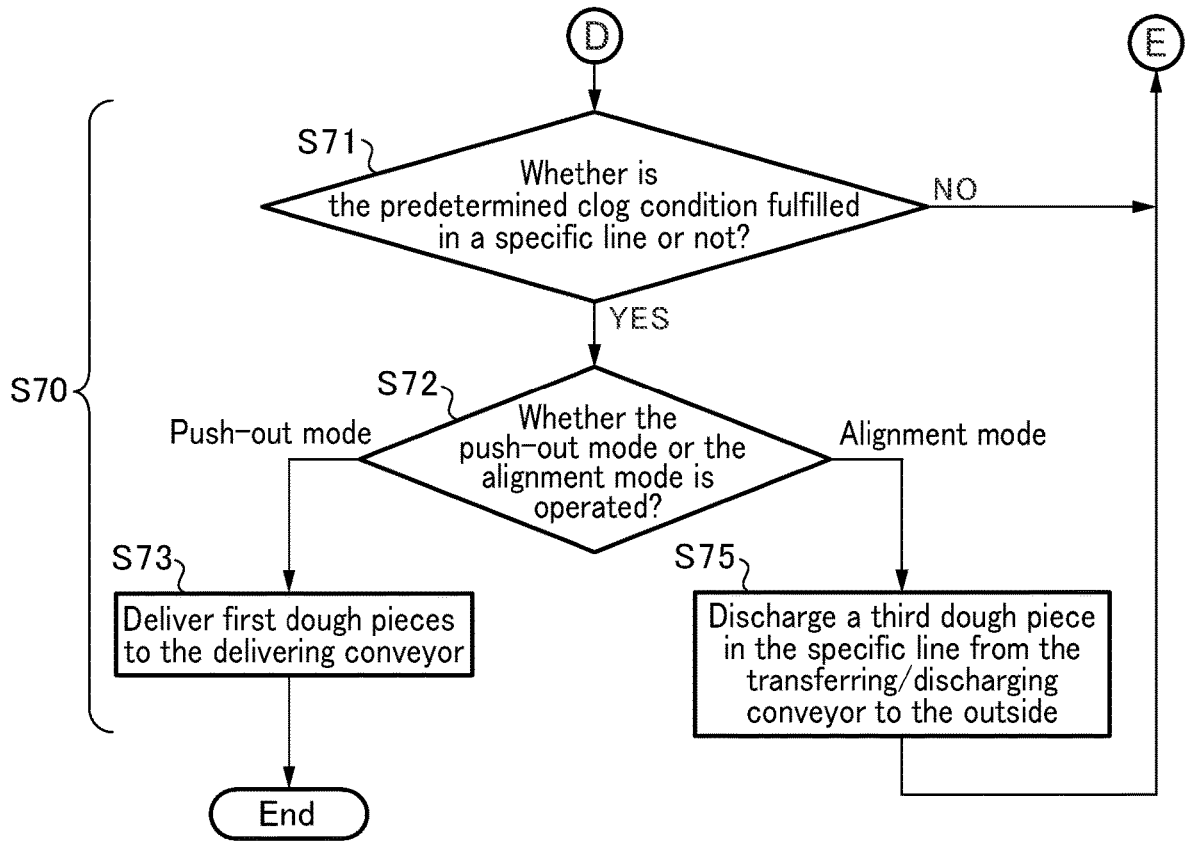
FIG. 9 is a flowchart of a delivering routine.
Figure 10:
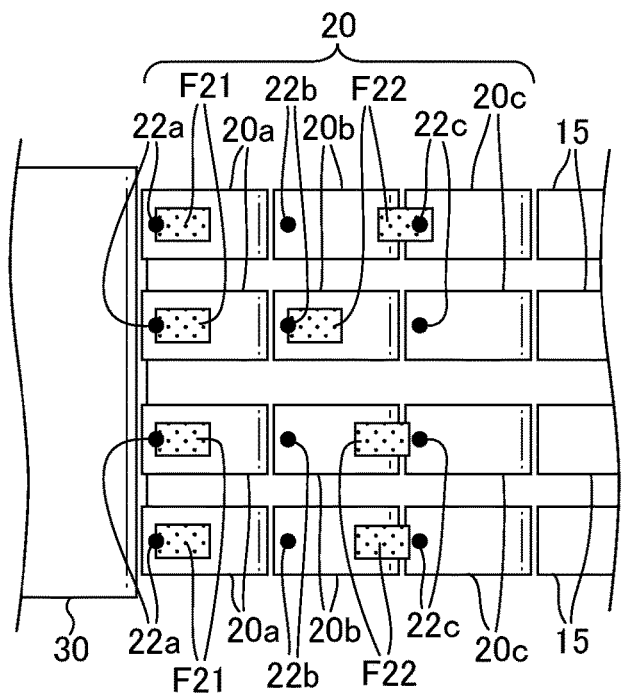
FIG. 10 is a view showing locations of dough pieces.

When the delivering interval has passed from the previous delivering action, in S42, whether the first dough pieces F21 are present at the stop positions on the outlet conveyors 20a in all of the lines 1, 2, 3, 4 (YES) or not (NO) is determined. This is determined, for example, by determining whether the outlet conveyor 20a is stopped or not in each of the lines. In the case of YES (FIG. 10), the four first dough pieces F21 are aligned with each other in the lateral direction B, and the flow goes to S43. In the case of NO, the flow goes to S71 (FIG. 9).

Figure 11:
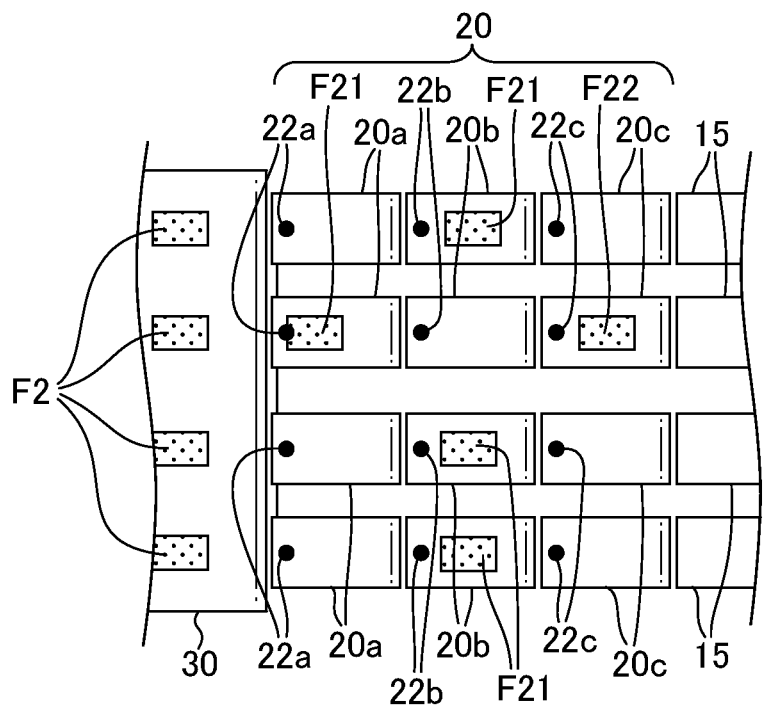
FIG. 11 is a view showing locations of dough pieces.

When the first dough pieces F21 in all of the lines 1, 2, 3, 4 are present at the stop positions on the outlet conveyors 20a, namely, when the outlet conveyors 20a in all of the lines 1, 2, 3, 4 are stopped, in S43, the (four) first dough pieces F21 in all of the lines aligned with each other in the lateral direction are delivered from the outlet conveyors 20a to the delivering conveyer 30 by driving all of the conveyors 20a, 20b, 20c in all of the lines 1, 2, 3, 4 (FIG. 11). This delivering action is a normal delivering action without empty spaces in the lateral direction. After that, the flow goes to S61 (FIG. 8) explained later.

In this way, since the normal delivering action is operated after the delivering interval has passed from the previous delivering action, the downstream clog of the arranging conveyor system 20 can be prevented from being caused.

FIG. 7 shows a flow S50 when the upstream clog is caused before the delivering interval has passed from the previous delivering action. Specifically, when the delivering interval has not been passed from the previous delivering action, in S51, whether a predetermined clog condition in a specific line is fulfilled (YES) or not (NO) is determined. In the case of YES, the upstream clog is caused, and the flow goes to S53. In the case of NO, the flow returns to S41 (FIG. 6).

Figure 12:
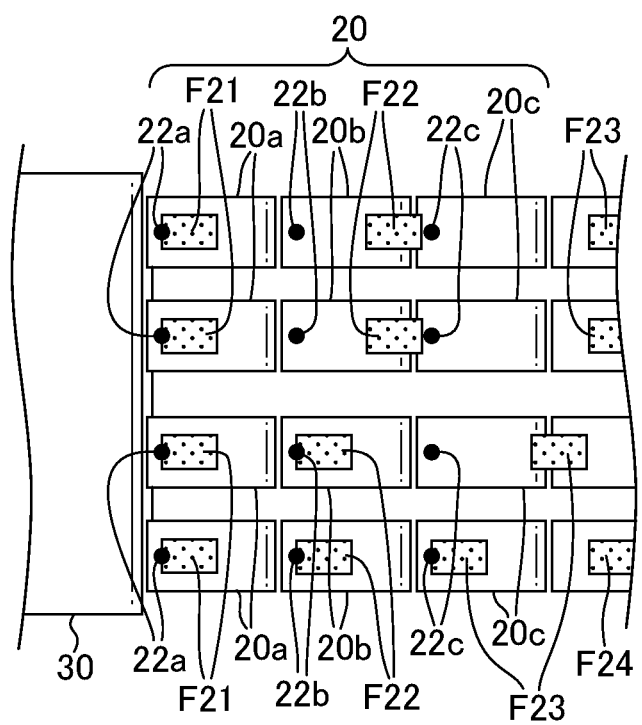
FIG. 12 is a view showing locations of dough pieces.

The predetermined clog condition is, for example, that in a specific line, a fourth dough piece F24 comes to the transferring/discharging conveyor 20c while the first, second, third dough pieces F21, F22, F23 are present at the stop positions on all of the conveyors 20a, 20b, 20c, or that in a specific line, a third dough piece F23 has reached the stop position on the transferring/discharging conveyor 20c while the first, second dough pieces F21, F22 are present at the stop positions on the conveyors 20a, 20b (see FIG. 12 for each of the conditions). The fact that the fourth dough piece F24 in the specific line comes to the transferring/discharging conveyor 20b can be detected, for example, by the fact that the fourth dough piece F24 is present on the weighing conveyor 15. The fact that the third dough piece F23 in the specific line has reached the stop position on the transferring/discharging conveyor 20b can be detected, for example, by a fact that the third dough piece F23 has reached the sensor 22b of the transferring/discharging conveyor 20b.

Figure 13:
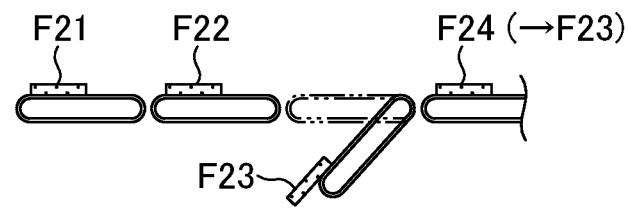
FIG. 13 is a view showing locations of dough pieces.

When the predetermined clog condition is fulfilled, in S53, the third dough piece F23 in the specific line is discharged outside of the arranging conveyor system 20. For example, the third dough piece F23 in the specific line is discharged outside of the arranging conveyor system 20 by lowering the downstream end of and driving the transferring/discharging conveyor 20c in the specific line (FIG. 13). After that, the fourth dough piece F24 is treated as the third dough piece F23. Subsequently, the flow returns to S41 (FIG. 6).

In this way when the upstream clog is caused, the dough pieces F21 aligned with each other on the outlet conveyors 20a are not delivered from the outlet conveyors 20a, and are still waiting. Thus, a frequency of the state in which a smaller number of the dough pieces aligned with each other in the lateral direction B are delivered can be decreased.

Figure 8:
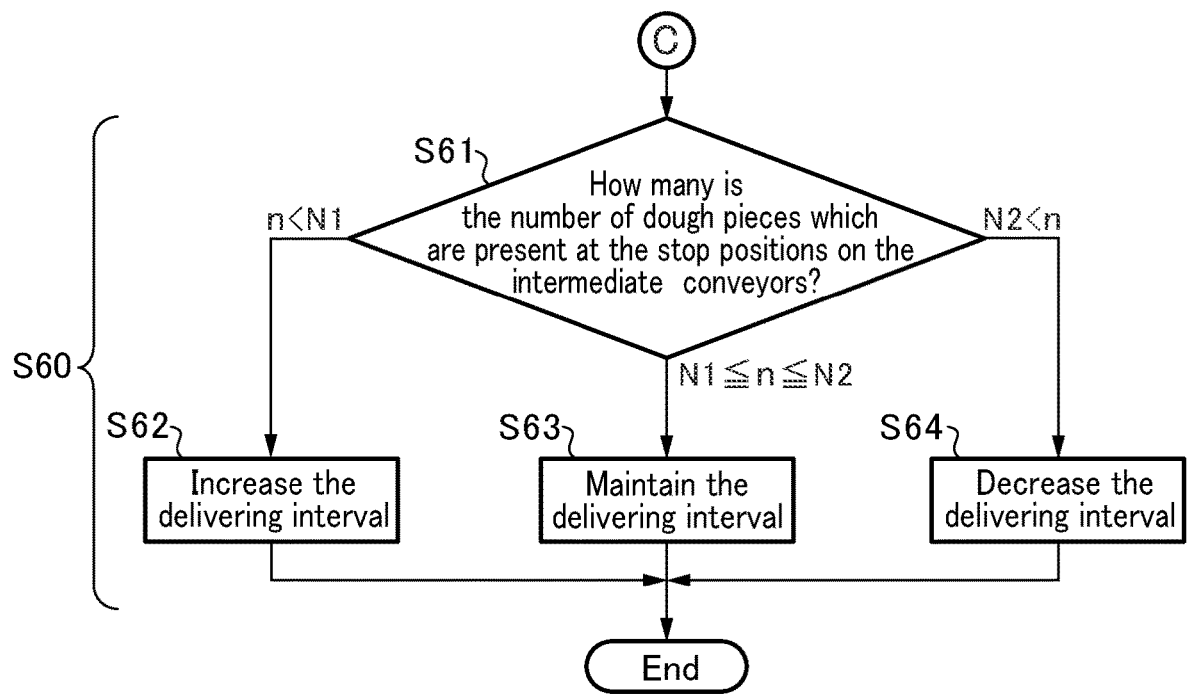
FIG. 8 is a flowchart of a delivering routine.

FIG. 8 shows a flow S60, by which the delivering interval is adjusted after a normal delivering action is operated. Specifically, in S61, after the normal delivering action is operated, the number n of the second dough pieces F22 which are present at the stop positions on the intermediate conveyors 20b is determined. When the number n is smaller than a predetermined range (n<N1) or smaller than or equal to a first predetermined number, the flow goes to S62 to increase the delivering interval. For example, if N1=N2=2, when n=0 (not shown) or n=1 (FIG. 10) (n is smaller than or equal to the first predetermined number or one), the delivering interval would be increased. For example, the predetermined value of the delivering interval may be updated from 1 second to 1.01 seconds (a value of the time interval), from 60 rpm to 59.5 rpm (a value of the number of cycles converted from the time interval), or from 120 mm to 121.2 mm (a value of the distance or pitch).

Figure 14:
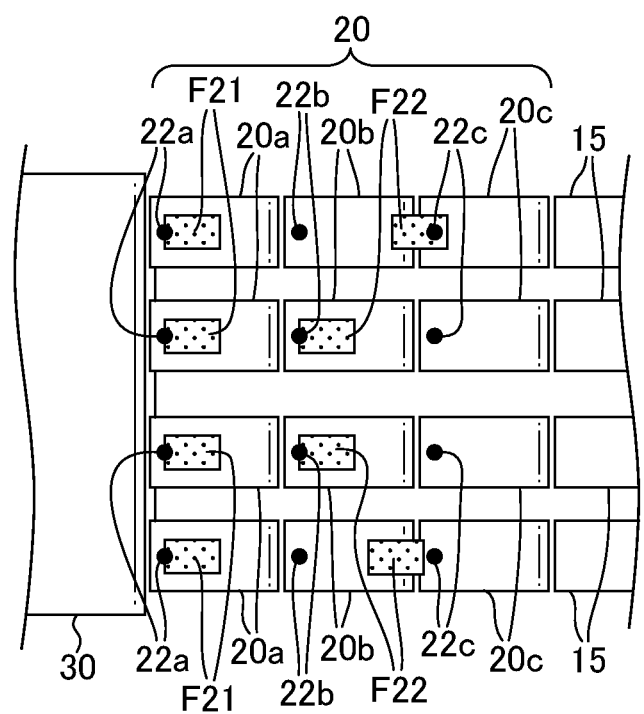
FIG. 14 is a view showing locations of dough pieces.

When the number n is within the predetermined range (N1≤n≤N2), the flow goes to S63 to maintain the delivering interval. For example, if N1=N2=2, when n=2 (FIG. 14), the delivering interval would be maintained and not updated.

Figure 15:
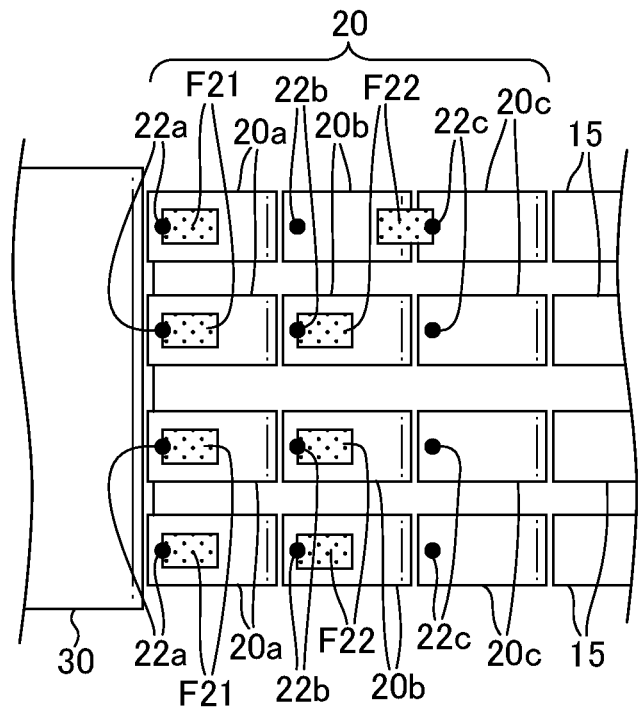
FIG. 15 is a view showing locations of dough pieces.
Figure 16:
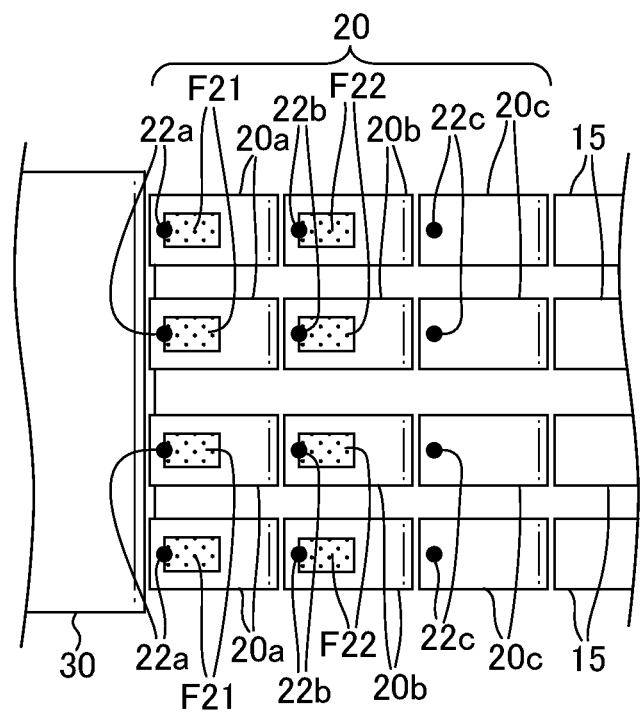
FIG. 16 is a view showing locations of dough pieces.

When the number n is larger than the predetermined range (N2<n) or larger than or equal to a second predetermined number, the flow goes to S64 to decrease the delivering interval. For example, if N1=N2=2, when n=3 (FIG. 15) or n=4 (FIG. 16) (n is larger than or equal to the second predetermined number or three), the delivering interval would be decreased. For example, the predetermined value of the delivering interval may be updated from 1 second to 0.991 seconds (a value of the time interval), from 60 rpm to 60.5 rpm (a value of the number of cycles converted from the time interval), or from 120 mm to 118.8 mm (a value of the distance or pitch).

In a case that the dough pieces F21 in the plurality of lines are delivered from the outlet conveyors 20a, when the number of the dough pieces F22 which are present at the stop positions on the intermediate conveyors 20b is smaller than the predetermined range or smaller than or equal to the first predetermined number, since an amount of receiving the dough pieces F2 is smaller than an amount of delivering the dough pieces F2, the predetermined value of the delivering interval is updated to increase the delivering interval. Further, in the case that the dough pieces F21 in the plurality of lines are delivered from the outlet conveyors 20a, when the number of the dough pieces F22 which are present at the stop positions on the intermediate conveyors 20b is larger than the predetermined range or larger than or equal to the second predetermined number, since an amount of receiving the dough pieces F2 is larger than an amount of delivering the dough pieces F2, the predetermined value of the delivering interval is updated to decrease the delivering interval. Thus, the delivering interval is adjusted to make the amount of receiving the dough pieces F2 close to the amount of delivering the dough pieces F2 so that the upstream clog is prevented from being caused. As a result, the frequency of the state in which a smaller number of the dough pieces aligned with each other in the lateral direction B are delivered can be decreased.

FIG. 9 shows a flow S70 when the upstream clog is caused after the delivering interval has passed from the previous delivering action. After the delivering interval has passed from the previous delivering action and when a first dough piece F21 in at least one of the plurality of lines is not present at the stop position on the outlet conveyor 20a, in S71, whether the predetermined clog condition in a specific line is fulfilled (YES) or not (NO) is determined. In the case of YES, the upstream clog is caused, and the flow goes to S72. In the case of NO, the flow returns to S42 (FIG. 6).

Figure 17:
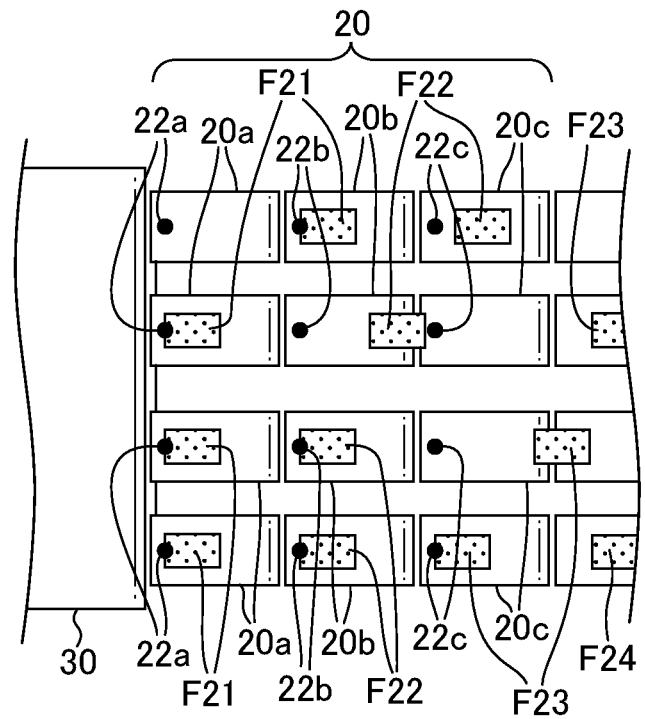
FIG. 17 is a view showing locations of dough pieces.

The predetermined clog condition is similar to that in S51 shown in FIG. 7. For example, the predetermined clog condition is that in a specific line, a fourth dough piece F24 comes to the transferring/discharging conveyor 20c while the first, second, third dough pieces F21, F22, F23 are present at the stop positions on all of the conveyors 20a, 20b, 20c, or that in a specific line, a third dough piece F23 has reached the stop position on the transferring/discharging conveyor 20c while the first, second dough pieces F21, F22 are present at the stop positions on the conveyors 20a, 20b (see FIG. 17 for each of the conditions).

When the predetermined clog condition in the specific line is fulfilled, in S72, whether a push-out mode or an alignment mode is operated is confirmed. Whether the push-out mode or the alignment mode is operated is preset.

Figure 18:
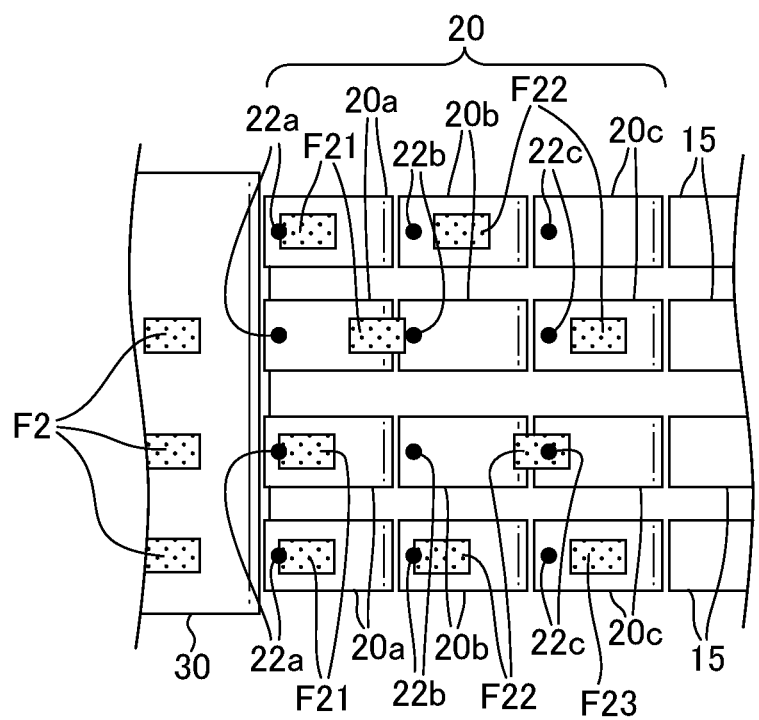
FIG. 18 is a view showing locations of dough pieces.

When the push-out mode is operated, the flow goes to S73 to deliver the first dough pieces F21 from the outlet conveyors 20a to the delivering conveyor 30 (FIG. 18) by driving all of the conveyors 20a, 20b, 20c in all of the lines 1, 2, 3, 4. This delivering action is that with an empty space in the lateral direction B. Then, the delivering routine is ended.

In the push-out mode, although a smaller number of the dough pieces F21 aligned with each other in the lateral direction B are delivered, an amount of delivering the dough pieces is increased so that the upstream clog can be relaxed.

When the alignment mode is operated, the flow goes to S75 to discharge a third dough piece F23 in the specific line outside of the arranging conveyor system 20. For example, the third dough piece F23 in the specific line is discharged outside of the arranging conveyor system 20 by lowering the downstream end of and driving the transferring/discharging conveyor 20c in the specific line (FIG. 13). After that, the fourth dough piece F24 is treated as the third dough piece F23. Subsequently, the flow returns to S42 (FIG. 6).

In the alignment mode, the dough pieces F21 aligned with each other on the outlet conveyors 20a are not delivered from the outlet conveyers 20a, and are still waiting. Thus, the frequency of a state in which a smaller number of the dough pieces aligned with each other in the lateral direction B are delivered can be decreased.

Now, although the embodiment of the present invention have been explained, the present invention is not limited to the above-described embodiment which can be renewed in various ways within the scope of the claimed invention, and it is needless to say that such renewed embodiments fall within the scope of the present invention.

Although bread dough is explained as an example of a conveyed object, the conveyed object is not limited to such bread dough.

In the above-described embodiment, the flow S60 and/or the flow S70 may be omitted.

In the above-described embodiment, although one intermediate conveyor 20b of the arranging conveyor system 20 is provided in the traveling direction, a plurality of intermediate conveyors may be provided in the traveling direction, and each of the intermediate conveyors may have the same function as the intermediate conveyor 20b in the above-described embodiment. When such a plurality of intermediate conveyors are provided in the traveling direction, the number n of the second dough pieces F22 which are present at the stop positions on the intermediate conveyor 20b determined in S61 may be the number of the second dough pieces F22 which are present at the stop positions on the intermediate conveyors 20b adjacent to the outlet conveyors 20a, or may be the number of the second and subsequent dough pieces which are present at the stop positions on the plurality of intermediate conveyors provided in the traveling direction.

In addition to the above-described embodiment, the flow S60 may be added after S73, and further, the flow S70 for the alignment mode may be omitted. In this case, when the delivering interval has passed from the previous delivering action and the first dough piece F21 in at least one of the plurality of lines (may be all lines) is delivered downstream from the outlet conveyor, the number of the conveyed objects which are present at the stop positions on the intermediate conveyors of the plurality of lines may be determined.

In the above-described embodiment, although the downstream end of the transferring/discharging conveyor 20c is capable of swinging downward at the discharging action, another way may be employed. For example, the downstream end of the transferring/discharging conveyor 20c may be extendable and retractable in the flow direction A, and may be retracted upstream in the flow direction A at the discharging action to drop and discharge the third dough piece F23. The transferring/discharging conveyor 20c may discharge a third dough piece F23 by a push-out device for pushing out the third dough piece F2 in the lateral direction.

In the above-described embodiment, although the dough piece supplying system 100 supplies dough pieces F2 in the four lines in the traveling direction A and make the dough pieces F2 to be aligned with each other in the lateral direction B, it may supply dough pieces F2 in any number of lines (even number of lines or odd number of lines) in the traveling direction A and make the dough pieces F2 to be aligned with each other in the lateral direction B.

In the above-described embodiment, although the number n is classified into three cases (within the predetermined range (N1≤n≤N2), (n is smaller than the predetermined range (n<N1) or smaller than or equal to the first predetermined number, and n is larger than the predetermined range (N2<n) or larger than or equal to the second predetermined number), the predetermined range may not be provided and S63 shown in FIG. 8 for maintaining the delivering interval may be omitted. For example, in case that the number of the lines of the dough pieces F2 is 3, the number n may be classified into a case where the number n is smaller than or equal to the predetermined first number or 1 (n=0 or n=1) and a case where the number n is equal to or more than the predetermined second number or 2 (n=2 or n=3), and the S63 may be omitted.

In the above-described embodiment, when the number n is smaller than the predetermined range (n<N1) or smaller than or equal to the predetermined first value, in S62, the delivering interval may be increased with a decrease in the value of the number n. For example, if N1=N2=2, when n=0 (not shown), the delivering interval may be increased from 1 second to 1.02 seconds, and when n=1 (FIG. 10), the delivering interval may be increased from 1 second to 1.01 seconds. Similarly, when the number n is larger than the predetermined range (N2<n) or larger than or equal to the predetermined second value, in S64, the delivering interval may be decreased with an increase in the value of the number n. For example, if N1=N2=2, when n=3 (FIG. 15), the delivering interval may be decreased from 1 second to 0.99 seconds, and when n=4 (FIG. 16), the delivering interval may be decreased from 1 second to 0.98 seconds. Thus, by increasing or decreasing the delivering interval according to the value of the number n, more precise control can be performed.

- 20: arranging conveyor system
- 20a: outlet conveyor
- 20b: intermediate conveyor
- 20c: transferring/discharging conveyor
- F2: dough piece
- F21: first dough piece
- F22: second dough piece
- F23: third dough piece

What is claimed:

1. A method for delivering a plurality of conveyed objects with aligning the conveyed objects in a lateral direction with respect to a traveling direction by an arranging conveyor system, the conveyed objects being supplied in a plurality of lines in the traveling direction without being aligned in the lateral direction, the arranging conveyor system having, for each of the plurality of lines, an outlet conveyor, at least one intermediate conveyor disposed adjacent to and upstream of the outlet conveyor, and a transferring/discharging conveyor disposed adjacent to and upstream of the intermediate conveyor, comprising:
   stopping a conveyed object at a stop position on the outlet conveyer in each of the plurality of lines to align the conveyed objects in the lateral direction;
   setting a delivering interval to a predetermined value for delivering the conveyed objects from the outlet conveyor with aligning the conveyed objects with each other in the lateral direction;
   determining whether the delivering interval has passed from a previous delivering action;
   delivering the conveyed objects in all of the plurality of lines downstream from the outlet conveyers when the delivering interval has passed from the previous delivering action and the conveyed objects in all of the plurality of lines are present at the stop positions on the outlet conveyers; and
   discharging the conveyed object outside of the arranging conveyor system, which conveyed object is present in a specific line of the plurality of lines at a stop position on the transferring/discharging conveyor, when the delivering interval has not passed from the previous delivering action and a predetermined clog condition in the specific line is fulfilled.

2. The method according to claim 1, wherein the predetermined clog condition is:
   when the next conveyed object in the specific line comes close to the transferring/discharging conveyor while the conveyed objects in the specific line are present at the stop positions on all of the outlet conveyor, the at least one intermediate conveyor, and the transferring/discharging conveyor; or
   when the next conveyed object in the specific line has reached the stop position on the transferring/discharging conveyor while the conveyed objects in the specific line are present at the stop positions on all of the outlet conveyor and the at least one intermediate conveyor.

3. The method according to claim 1, further comprising:
   determining the number of the conveyed objects in the plurality of lines, which conveyed objects are present at stop positions on the intermediate conveyors, when the conveyed objects in all of the plurality of lines are delivered downstream from the outlet conveyors;
   updating the predetermined value to increase the delivering interval when the number is smaller than a predetermined range or is smaller than or equal to a first predetermined number; and
   updating the predetermined value to decrease the delivering interval when the number is larger than the predetermined range or is larger than or equal to a second predetermined number.

4. The method according to claim 3,
   wherein when the number is smaller than the predetermined range or is smaller than or equal to the predetermined first value, the delivering interval is increased with a decrease in the value of the number, and
   wherein when the number is larger than the predetermined range or is larger than or equal to the predetermined second value, the delivering interval is decreased with an increase in the value of the number.

5. The method according to claims 1, further comprising:
   delivering the conveyed objects in the plurality of lines downstream from the outlet conveyor, which conveyed objects are present at the stop positions on the outlet conveyors, when the delivering interval has passed from the previous delivering action, the conveyed object in at least one of the plurality of lines is not present at the stop position on the outlet conveyor, and the predetermined clog condition in a specific line of the plurality of lines is fulfilled.

6. The method according to claims 1, further comprising:
   discharging the conveyed object in a specific line outside of the arranging conveyor system, which conveyed object is present at the stop position on the transferring/discharging conveyor, when the delivering interval has passed from the previous delivering action, the conveyed object in at least one of the plurality of lines is not present at the stop position on the outlet conveyor, and the predetermined clog condition in the specific line is fulfilled.

7. A method for delivering a plurality of conveyed objects with aligning the conveyed objects in a lateral direction with respect to a traveling direction by an arranging conveyor system, the conveyed objects being supplied in a plurality of lines in the traveling direction without being aligned in the lateral direction, the arranging conveyor system having, for each of the plurality of lines, an outlet conveyor, at least one intermediate conveyor disposed adjacent to and upstream of the outlet conveyor, and a transferring/discharging conveyor disposed adjacent to and upstream of the intermediate conveyor, comprising:
   stopping the conveyed object at a stop position on the outlet conveyer in each of the plurality of lines to align the conveyed objects in the lateral direction;
   setting a delivering interval to a predetermined value for delivering the conveyed objects from the outlet conveyor with aligning the conveyed objects with each other in the lateral direction;

determining whether the delivering interval has passed from a previous delivering action;

determining the number of the conveyed objects in the plurality of lines, which conveyed objects are present at stop positions on the intermediate conveyors, after the delivering interval has passed from a previous delivering action and when the conveyed object in at least one of the plurality of lines is delivered downstream from a outlet conveyor;

updating the predetermined value to increase the delivering interval when the number is smaller than a predetermined range or is smaller than or equal to a first predetermined number; and updating the predetermined value to decrease the delivering interval when the number is larger than the predetermined range or is larger than or equal to a second predetermined number.

8. The method according to claim 7, wherein when the number is smaller than the predetermined range or is smaller than or equal to the predetermined first value, the delivering interval is increased with a decrease in the value of the number, and wherein when the number is larger than the predetermined range or is larger than or equal to the predetermined second value, the delivering interval is decreased with an increase in the value of the number.

9. The method according to any one of claims 1-8, wherein the conveyed object is a dough piece.

* * * * *